United States Patent
Mohamed

(10) Patent No.: US 9,989,161 B2
(45) Date of Patent: Jun. 5, 2018

(54) SYSTEMS AND METHODS FOR A REED VALVE MODULE AND VALVE ASSEMBLY

(75) Inventor: Zahroof Mohamed, Cypress, TX (US)

(73) Assignee: Zahroof Valves, Inc., Houston, TX (US)

(*) Notice: Subject to any disclaimer, the term of this patent is extended or adjusted under 35 U.S.C. 154(b) by 0 days. days.

(21) Appl. No.: 13/510,245

(22) PCT Filed: Nov. 18, 2010

(86) PCT No.: PCT/US2010/057193
§ 371 (c)(1),
(2), (4) Date: May 16, 2012

(87) PCT Pub. No.: WO2011/063096
PCT Pub. Date: May 26, 2011

(65) Prior Publication Data
US 2012/0227847 A1    Sep. 13, 2012

Related U.S. Application Data

(60) Provisional application No. 61/262,248, filed on Nov. 18, 2009.

(51) Int. Cl.
*F16K 15/14*     (2006.01)
*F16K 15/16*     (2006.01)
(Continued)

(52) U.S. Cl.
CPC .............. *F16K 15/16* (2013.01); *F01L 3/205* (2013.01); *F04B 39/1066* (2013.01);
(Continued)

(58) Field of Classification Search
CPC .... F16K 15/144; F16K 15/116; F16K 15/202; F01L 3/205; Y10T 137/7891;
(Continued)

(56) References Cited

U.S. PATENT DOCUMENTS 1,022,157 A * 4/1912 Scott ........................ F16K 15/16
                                                                137/512
1,599,414 A * 9/1926 Huff ........................... 137/512.1
(Continued)

FOREIGN PATENT DOCUMENTS

CH           255795 A  *  7/1948  .......... F04B 39/1093
CN         85201501 U     1/1986
(Continued)

OTHER PUBLICATIONS

PCT International Search Report and Written Opinion, dated Jan. 19, 2011, Appl No. PCT/US/2010/057193, "Systems and Methods for a Reed Valve Module and Valve Assembly", filed Nov. 18, 2010, 10 pgs.

(Continued)

*Primary Examiner* — Mary McManmon
*Assistant Examiner* — Hailey K Do
(74) *Attorney, Agent, or Firm* — Amerson Law Firm, PLLC

(57) ABSTRACT

Reed valve modules and corresponding reed valve assemblies are disclosed. In one embodiment, the reed valve module includes a body having a single or a plurality of sealing faces, a seat and flow passages from the seat to the sealing face(s). The reed valve module also includes one or a plurality of petals. In some embodiments, the module further includes a petal guard. Novel reed valve assemblies are disclosed incorporating the reed valve modules. One embodiment of the reed valve assembly includes a seat with a plurality of fluid conduits, a retainer plate with a plurality of fluid conduits and a means for receiving recesses between the seat plate and retainer plate. Other devices, systems, and methods related to reed valve modules and valve assemblies are also disclosed.

50 Claims, 9 Drawing Sheets

(51) Int. Cl.
*F16K 15/20* (2006.01)
*F01L 3/20* (2006.01)
*F04B 39/10* (2006.01)
*F04B 53/10* (2006.01)

(52) U.S. Cl.
CPC ........ *F04B 39/1073* (2013.01); *F04B 53/104* (2013.01); *F16K 15/144* (2013.01); *F16K 15/202* (2013.01); *Y10T 137/0491* (2015.04); *Y10T 137/784* (2015.04); *Y10T 137/7839* (2015.04); *Y10T 137/7843* (2015.04); *Y10T 137/7891* (2015.04); *Y10T 137/7892* (2015.04)

(58) Field of Classification Search
CPC ........... Y10T 137/7892; Y10T 137/784; Y10T 137/7839; Y10T 137/7843
USPC .... 137/512.1, 512.12, 512.4, 893, 852, 855, 137/853, 859
See application file for complete search history.

(56) References Cited

U.S. PATENT DOCUMENTS

| | | | | |
|---|---|---|---|---|
| 1,632,155 | A | * | 6/1927 | Vollmann ............... 137/512.1 |
| 1,754,747 | A | | 4/1930 | Feldbush |
| 1,799,103 | A | | 3/1931 | Klimek |
| 2,199,307 | A | * | 4/1940 | Eichelberg .......... F04B 39/1093 137/454.4 |
| 2,408,056 | A | | 9/1946 | Farmer |
| 2,505,757 | A | * | 5/1950 | Dunbar et al. ............. 137/512.1 |
| 2,781,777 | A | * | 2/1957 | Oxnam ................... F16K 15/16 137/512.1 |
| 2,934,083 | A | * | 4/1960 | Norton ..................... 137/454.4 |
| 3,286,728 | A | * | 11/1966 | Stephenson ................. 137/856 |
| 3,395,858 | A | * | 8/1968 | Spencer ............. F04B 39/1073 137/512.15 |
| 3,412,754 | A | * | 11/1968 | Schou et al. ................ 137/512.1 |
| 3,556,136 | A | | 1/1971 | White |
| 3,703,912 | A | | 11/1972 | Bauer et al. |
| 3,905,340 | A | | 9/1975 | Boyesen |
| 3,905,341 | A | | 9/1975 | Boyesen |
| 4,036,251 | A | * | 7/1977 | Hartwick et al. .......... 137/512.1 |
| 4,051,820 | A | | 10/1977 | Boyesen |
| 4,058,138 | A | * | 11/1977 | Viktorov et al. .......... 137/512.1 |
| 4,168,722 | A | | 9/1979 | Mayer et al. |
| 4,172,696 | A | | 10/1979 | Gyory |
| 4,173,985 | A | * | 11/1979 | Kirpichenkov ............. 137/512.1 |
| 4,195,660 | A | | 4/1980 | Taipale et al. |
| 4,290,455 | A | | 9/1981 | Honda et al. |
| 4,294,202 | A | | 10/1981 | Boyesen |
| 4,483,363 | A | | 11/1984 | Madoche et al. |
| 4,633,825 | A | | 1/1987 | Flaig |
| 4,643,139 | A | | 2/1987 | Hargreaves |
| 4,819,689 | A | | 4/1989 | Owsley et al. |
| 4,854,341 | A | | 8/1989 | Bauer |
| 4,872,481 | A | | 10/1989 | Shaw et al. |
| 4,879,976 | A | | 11/1989 | Boyesen |
| 4,924,906 | A | | 5/1990 | Hrabal |
| 4,934,362 | A | | 6/1990 | Brann |
| 5,027,754 | A | | 7/1991 | Morone |
| 5,103,867 | A | | 4/1992 | Wu |
| 5,245,956 | A | | 9/1993 | Martin |
| 5,364,244 | A | | 11/1994 | Taylor-McCune et al. |
| 5,390,699 | A | | 2/1995 | Yamada |
| 5,454,397 | A | | 10/1995 | Miszczak |
| 5,672,053 | A | | 9/1997 | Sabha |
| 6,394,128 | B1 | * | 5/2002 | Concialdi ..................... 137/550 |
| 6,880,577 | B2 | | 4/2005 | Tassinari et al. |
| 7,028,649 | B1 | | 4/2006 | Hosaluk et al. |
| 7,614,422 | B2 | | 11/2009 | Tassinari et al. |
| 8,365,771 | B2 | * | 2/2013 | Xue ..................... A62B 18/025 128/206.12 |
| 8,485,801 | B2 | * | 7/2013 | Mohamed ..................... 417/569 |
| 2003/0019527 | A1 | | 1/2003 | Oppermann et al. |
| 2007/0065321 | A1 | | 3/2007 | Durham |
| 2008/0156381 | A1 | | 7/2008 | Tuymer |
| 2008/0223459 | A1 | | 9/2008 | Walpole |
| 2010/0040497 | A1 | | 2/2010 | Mohamed |
| 2010/0090149 | A1 | | 4/2010 | Thompson et al. |
| 2010/0108163 | A1 | | 5/2010 | Mohamed |
| 2011/0139158 | A1 | | 6/2011 | Xue |

FOREIGN PATENT DOCUMENTS

| | | |
|---|---|---|
| EP | 0426223 A1 | 5/1991 |
| GB | 496795 A | 6/1938 |
| GB | 583847 A | 1/1947 |
| GB | 2361290 A | 8/2004 |
| SU | 1002660 A1 | 3/1983 |
| WO | 2008091672 A1 | 7/2008 |

OTHER PUBLICATIONS

European Search Report and Search Opinion (EP 10 832 162.1), dated Apr. 15, 2013.
New Zealand First Examination (NZ 600534), dated Feb. 11, 2013.
Chinese First Examination Notification (CN 201080052302.3), dated Jul. 10, 2013.
New Zealand Examination Report (NZ 619638), dated Jan. 21, 2014.
New Zealand Examination Report (NZ 619640), dated Jan. 21, 2014.
Gulf Cooperation Council Examination Report (GC Appl. No. 17123), dated Nov. 24, 2013.
Office Action dated Dec. 12, 2014 from the Russian Patent Office for counterpart RU Application No. 2012125069, including translation and letter from foreign agent, 11 pages total.
New Zealand Intellectual Property Office Further Examination Report dated Jan. 17, 2014 for NZ Application No. 600534, 2 pages.
New Zealand Intellectual Property Office Further Examination Report dated Apr. 9, 2014 for NZ Application No. 600534, 2 pages.
New Zealand Intellectual Property Office Further Examination Report dated Apr. 24, 2014 for NZ Application No. 619638, 3 pages.
GCC Patent Office Examination Report dated Feb. 9, 2014 for GCC Application No. GC 2010-17123, 5 pages.
China State Intellectual Property Office Examination Report dated Jan. 17, 2014 for CN Application No. 201080052302.3, 4 pages.
Ukraine Patent Office Decision to Grant dated Jun. 27, 2014 for UA Application No. 201207333, 11 pages.
European Patent Office Examination Report dated Sep. 17, 2014 for EP Application No. 10832162.1, 5 pages.
Mexican Institute of Industrial Property Office Action dated Jul. 7, 2014 for MX Application No. MX/a/2012/005767, 5 pages.
Examination Report dated May 22, 2015 from the European Patent Office for counterpart EP Application No. 10832162.1, 4 pages.
Office Action dated Jun. 17, 2015 from the Taiwan Patent Office for counterpart TW Application No. 99139749, including translation, 17 pages total.
Office Action dated Mar. 13, 2015, for MX Application No. MX/a/2012/005767, from Mexican Institute of Industrial Property, 6 pages.
Decision of Grant dated Apr. 16, 2015, for RU Application No. 2012125069, from Russian Patent Office, 20 pages.
Australian Office Action dated Nov. 19, 2015 for AU Application No. 2010322003, filed on Nov. 18, 2010 (PCT filing date).
Mexican Office Action dated Oct. 16, 2015 for MX Application No. MX/a/2012/005767, filed on Nov. 18, 2010 (PCT filing date).
Official Action from Malaysian patent application No. PI 2012002150 dated Jun. 15, 2016.
Official Action from Philippines patent application No. 1/2012/501100 dated Aug. 25, 2016.
Translation of Official Action from Taiwan patent application No. 99139749 dated Apr. 18, 2016.
Mexican Office Action dated Jun. 12, 2016 for MX Application No. MX/a/2012/005767, filed on Nov. 18, 2010 (PCT filing date).

(56) References Cited

OTHER PUBLICATIONS

Communication of Opposition dated Jul. 10, 2017 from European patent application No. 10832162.1, filed on Nov. 18, 2010 (PCT effective date).
Canadian Official Action dated Apr. 11, 2017 from Canadian patent application No. 2,816,820, filed on Nov. 18, 2010 (PCT effective date).
Canadian Examination Report dated Dec. 12, 2017 from Canadian patent application No. 2,816,820, filed on Nov. 18, 2010 (PCT effective date).
GCC Examination Report dated Sep. 19, 2017 from GCC divisional patent application No. GC 2010-26401, filed on Nov. 22, 2010 (parent effective date).

* cited by examiner

SYSTEMS AND METHODS FOR A REED VALVE MODULE AND VALVE ASSEMBLY

RELATED APPLICATIONS

This application claims priority to U.S. Provisional Patent Application 61/262,248, entitled "Reed Valve Module and Valve Assembly" filed Nov. 18, 2009, which is incorporated by reference in its entirety.

FIELD OF THE INVENTION

The present invention relates generally to valve assemblies. More particularly, the present invention relates to a novel reed valve module that can be used in a valve assembly in various flow control systems, including compression systems, and systems and methods thereof.

BACKGROUND

As will be appreciated, fluids, such as natural gas, hydrogen, process gases, refrigerants and air, have a wide array of uses in industrial and commercial applications. For instance, natural gas may be used to provide power to a range of vehicles, to heat homes during winter, and to operate various consumer appliances, such as ovens or clothes dryers. Further, natural gas may be used to generate electricity for distribution over a power grid. Different process gases and air may be used in the manufacture of an array of products and materials, including glass, steel, and plastics, for example.

To meet the demand for natural gas, companies may spend a significant amount of time and resources searching for, extracting, and transporting natural gas. Hydrogen may be produced centrally and distributed through pipelines. In process plants different gases or liquids are transported through passages to the point where it may be required. In most large factories air under pressure is made available at different points through a network of pipes. As may also be appreciated, transportation of such gases or liquids, such as through a pipeline from one point to another, is often facilitated by compression of the gas or liquid via a compressor or pump.

One common type of compressor for such applications is the reciprocating compressor. Such reciprocating compressors are positive-displacement devices that generally utilize a crankshaft that is coupled to pistons, via connecting rods and crossheads, to reciprocally drive the pistons and compress a fluid within attached compression cylinders. As may be appreciated by one skilled in the art, gas is generally introduced into compression chambers of the cylinders through one or more inlet or suction valve assemblies and, following compression, the fluid generally exits the cylinders via one or more outlet or discharge valve assemblies.

The type of valve assemblies commonly used in compressors includes poppet valves, plate valves, ring valves, channel valves and reed valves. In the current art, poppet valve, plate valve, ring valve and channel valve assemblies, all traditionally include a single or a set of sealing elements disposed between a seat plate and a guard plate. Current reed valve assemblies used in compressor applications consist of a seat plate, and a plurality of petals and guards/stoppers attached to the seat plate by a fastening means such as screws.

As many compressors routinely operate at hundreds or thousands of rotations per minute (rpm), the sealing elements also open and close at a similarly high rate. Due to this rapid cycling, the seat plate, the guard, and/or the sealing elements will often wear over time, leading to valve failure if left unchecked. To avoid such failure, in a preventive maintenance program, the valves are periodically removed from the compressor and refurbished. Sometimes failure cannot be avoided. However, the valves can typically be repaired and reused, especially the expensive seat and guard. This is typically accomplished through replacement of the sealing elements, machining/refinishing or replacement of the seat and/or guard, or the like. Of course, such maintenance is often time-consuming and/or costly.

In existing art, in the reed valve assembly, the petals and guards are attached to the seat/body/cage by individual fastening means. It is possible for these fastening means to loosen during operation, eventually coming off. Petals can fail in fatigue and pieces may break off. These loose pieces can fall into the cylinder and causing extensive damage to the compressor or engine piston/cylinder.

The cost of the power required to compress the gas is the major operational expense incurred by a company engaged in this business. The efficiency of the compressor determines the power required to operate it; the higher the efficiency, the lower the costs. Valve losses are a major source of loss in efficiency in compressors and can contribute from 5 to 20% of the overall operating costs. In existing reed valve, poppet valve, plate valve, ring valve and channel valve assemblies used in the compression process, the gas has to make two right angle turns to get by the sealing element while passing through the valve. The greater the turning angle, the greater the resistance to the flow through the compressor; directly affecting the efficiency adversely.

The amount of time required to install a valve successfully, determines the amount of time that a machine is down and, in turn, the amount of money that is lost due the machine being down. For valves installed in the field, it is very difficult to check the quality of the assembled valve as this depends on the tolerance of all the parts and how it is assembled. A minor problem in a seat or guard can mean that none of the sealing elements seal properly—and this can only be found after the entire valve has been assembled and installed.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. Embodiments of the present invention generally relate to a novel reed valve module and its valve assembly. In some exemplary embodiments, a reed valve module includes a body including a seating surface, one or more sealing faces, and one or more fluid conduits leading from the seating surface to the sealing faces. The reed valve module also includes a single or plurality of reed petals positioned over the sealing face of the module body and one or more walls opposite the body from the single or plurality of reed petals. In another embodiment, a reed valve module comprises a modular valve body having a plurality of faces and one or more ports and one or more reed petals each sized to substantially cover one or more of the one or more ports of the modular valve body. The reed valve module also includes a modular housing sized for a frictional fit when disposed within a receiving recess with the modular valve body and the one or more reed petals within and secured by a seat plate. In yet another embodiment, a reed valve module comprises a modular valve body having a plurality of faces and one or more ports and one or more reed petals each sized to substantially cover one or more of the one or more ports of the modular valve body. The modular valve body and the one or more reed petals are collectively sized for a frictional fit when disposed within a receiving recess with the modular valve body and the one or more reed petals within.

In another embodiment, a modular reed valve assembly comprises a seat plate including one or more fluid conduits and one or more receiving recesses, each proximate a respective fluid conduit of the one or more fluid conduits in the seat plate. The modular reed valve assembly also includes a retainer plate including one or more fluid conduits and one or more reed valve modules, sized to fit either individually or collectively within one of the one or more receiving recesses. In yet a further embodiment, a modular reed valve assembly comprises a seat plate including one or more fluid conduits and one or more receiving recesses, each proximate a respective fluid conduit of the one or more fluid conduits in the seat plate. Each of the one or more receiving recesses includes a groove and one or more reed valve modules. Each reed valve module comprises a modular housing including a protrusion sized to fit into the groove to secure the reed valve module when the modular housing is inserted into a respective one of the one or more receiving recesses.

In another embodiment, a method of assembling a reed valve module comprises the following: obtaining a modular reed valve body including a seating surface, one or more sealing faces, and one or/no/r fluid conduits leading from the seating surface to the sealing faces; obtaining at least one reed petal, sized for one or more of the one or more sealing faces; obtaining a modular housing; placing the at least one reed petal over the one or more of the one or more sealing faces; and placing the modular reed valve body and the at least one reed petal into the modular housing. In a further embodiment, a method of assembling a reed valve assembly comprises the following: obtaining one or more reed valve modules; obtaining a seat plate including one or more fluid conduits and one or more receiving recesses, each of the one or more receiving recesses proximate a respective fluid conduit of the one or more fluid conduits in the seat plate; and inserting one of the one or more reed valve modules into a respective receiving recess of the one or more receiving recesses. Another aspect of the present invention is a compressor comprised of a frame, a plurality of mechanical components disposed with the frame that compress a working fluid, and at least one modular reed valve assembly coupled to the frame and the plurality of mechanical components to control the flow of fluid through at least one modular reed valve.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
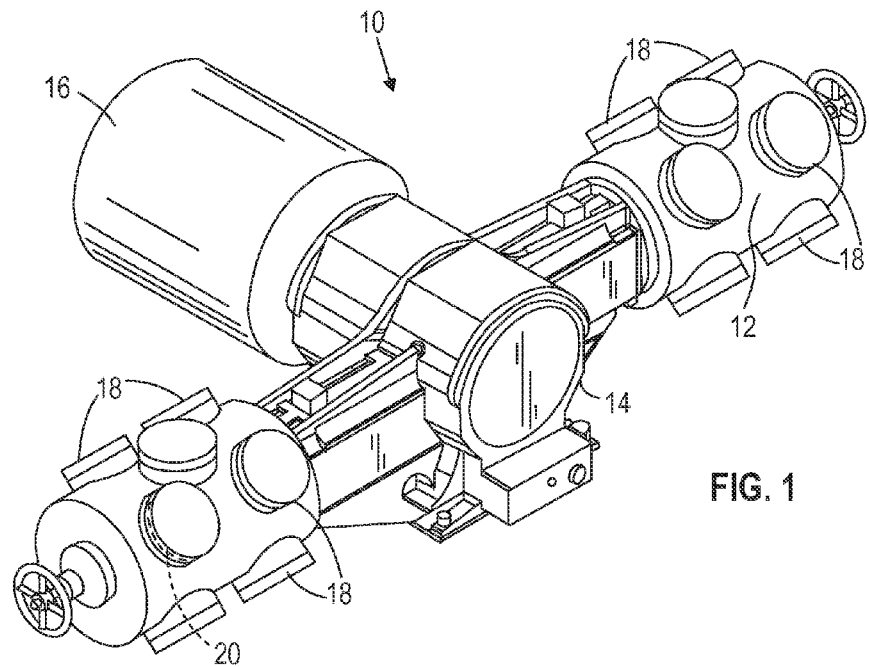
FIG. 1 is a perspective view of a reciprocating compressor including an exemplary modular reed valve assembly in accordance with one embodiment of the present invention.

Turning now to the figures, an exemplary compressor 10 is provided in FIG. 1. In the presently illustrated embodiment, the compressor 10 includes a pair of compression cylinders 12 coupled to a frame 14. As discussed in greater detail below, a variety of internal components may be disposed within the cylinders 12 and the frame 14 to enable compression of fluids within the cylinders 12. In one embodiment, the compressor 10 may be utilized to compress natural gas. However, in other embodiments, the compressor 10 may be configured and/or utilized to compress other fluids. A mechanical power source or driver 16, such as an engine or an electric motor, may be coupled to the compressor 10 to provide mechanical power to the various internal components and to enable compression of the fluid within the cylinders 12. To facilitate access to such internal components, as may be desired for diagnostic or maintenance purposes, openings in the frame 14 may be provided and selectively accessed via removable covers disposed over the openings.

Further, the exemplary cylinders 12 include capped recesses 18 configured to receive valve assemblies, such as modular reed valve assembly 20 in accordance with the embodiment of the present invention. While only a single modular reed valve assembly 20 is illustrated, it will be appreciated that, in various embodiments, additional modular reed valve assemblies 20 are included within some or all of the other capped recesses 18. It will also be appreciated that the cylinders 12 may include internal fluid conduits between the recesses 18 and the modular reed valve assemblies 20 to facilitate flow of a fluid into and out of the cylinders 12 through such modular reed valve assemblies 20. Additionally, various installation components, such as cages or fasteners (not shown here), may be employed to facilitate mounting of the modular reed valve assemblies 20 within the recesses 18.

Although the exemplary compressor 10 is illustrated as a two-throw reciprocating compressor, other compressor configurations may also employ and benefit from the presently disclosed techniques. For instance, in other embodiments, the compressor 10 may include a different number of cylinder throws, such as a four-throw compressor, a six-throw compressor, a couple-free reciprocating compressor, or the like. Further, other variations are also envisaged, including variations in the length of stroke, the operating speed, and the size, to name but a few. Further, the machine in which the valve is employed may be of a different type such as a screw compressor, scroll compressor, refrigeration compressor, a centrifugal compressor, a chiller, a process flow system etc.

Figure 2:
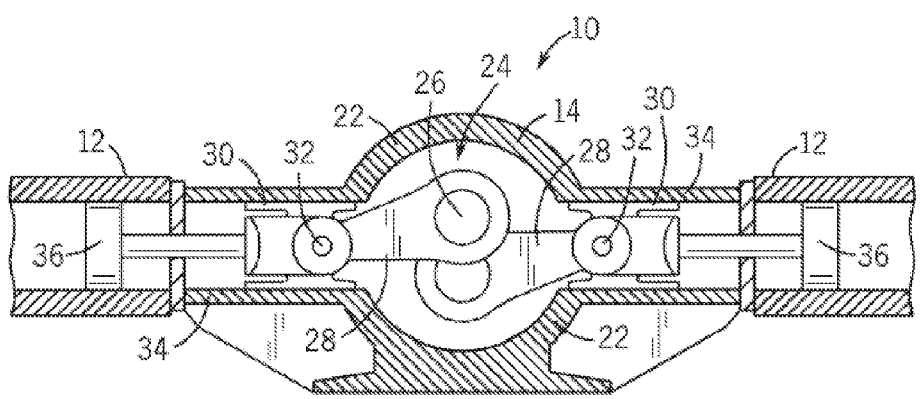
FIG. 2 is an axial cross-sectional view of the exemplary compressor of FIG. 1, illustrating internal components of the compressor in accordance with one embodiment of the present invention.

Across-sectional view of the exemplary compressor 10 is provided in FIG. 2, which illustrates a number of exemplary internal components of the compressor of FIG. 1. In the presently illustrated embodiment, the frame 14 of the exemplary compressor 10 includes a hollow central body or housing 22 that generally defines an interior volume 24 in which various internal components may be received, such as a crankshaft 26. In one embodiment, the central body 22 may have a generally curved or cylindrical shape. It should be noted, however, that the central body 22 may have other shapes or configurations in full accordance with the present techniques.

In operation, the driver 16 rotates the crankshaft 26 supported within the interior volume 24 of the frame 14. In one embodiment, the crankshaft 26 is coupled to crossheads 30 via connecting rods 28 and pins 32. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body 22, although other configurations are also envisaged. As may be appreciated, the rotational motion of the crankshaft 26 is translated via the connecting rods 28 to reciprocal linear motion of the crossheads 30 within the crosshead guides 34.

As noted above, the cylinders 12 are configured to receive a fluid for compression. The crossheads 30 are coupled to pistons 36 disposed within the cylinders 12, and the reciprocating motion of the crossheads allows compression of fluid within the cylinders 12 via the pistons 36. Particularly, as a piston 36 is driven forward (i.e., outwardly from central body 22) into a cylinder 12, the piston 36 forces fluid within the cylinder into a smaller volume, thereby increasing the pressure of the fluid. A discharge valve, such as modular reed valve assembly 20, may then open to allow the pressurized or compressed fluid to exit the cylinder 12. The piston 36 may then stroke backward, and additional fluid may enter the cylinder 12 through an inlet valve, which may also comprise a modular reed valve assembly 20, for compression in the same manner described above. Further, as will be appreciated, the cylinders 12 can be configured to facilitate fluid compression on both the forward and the backward strokes of the piston 36. For instance, as the piston 36 moves forward in the manner discussed above to compress fluid on one side of the piston, additional fluid may be introduced into the cylinder on the opposite side of the piston. Such fluid would then be compressed on the backward stroke of the piston 36.

Figure 3:
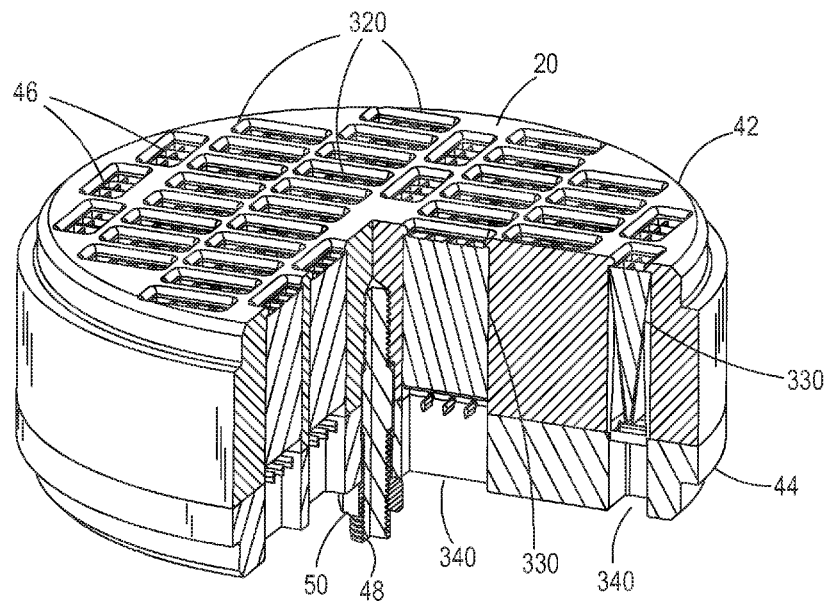
FIG. 3 is a view of the exemplary modular reed valve assembly with a partial cross section, according to one embodiment of the present invention.
Figure 4:
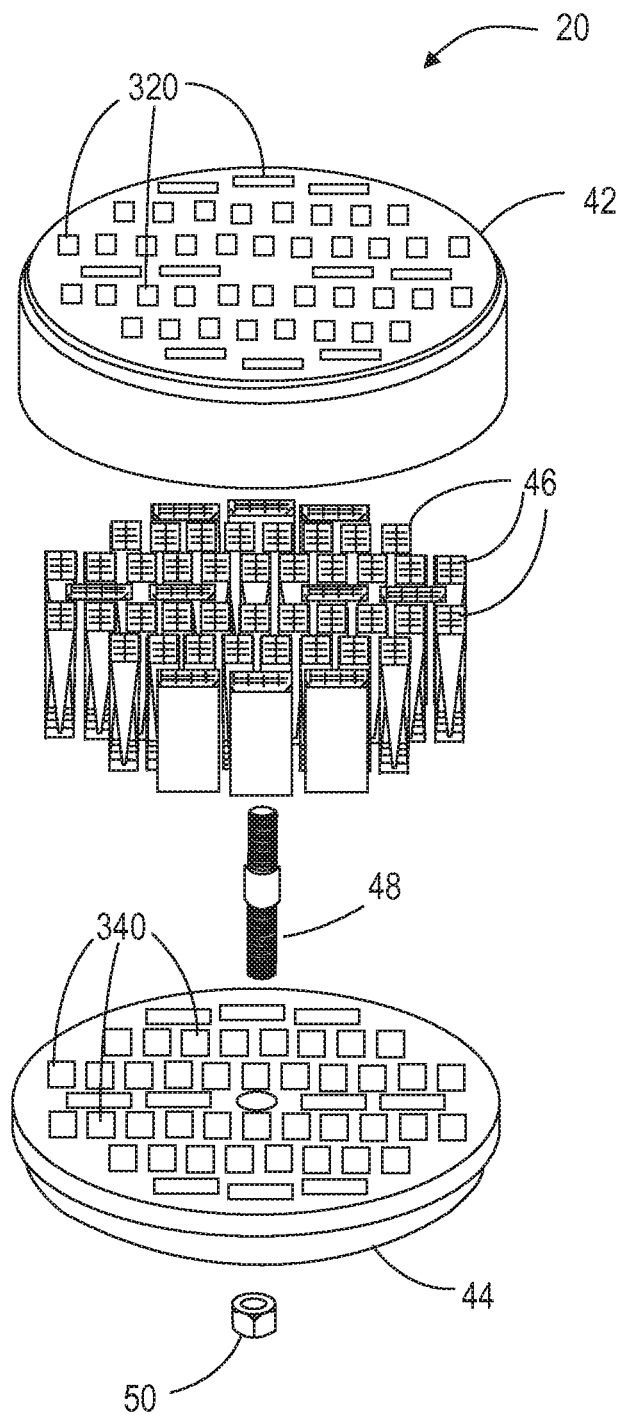
FIG. 4 is an exploded view of the modular reed valve of FIG. 3 illustrating certain components of the modular reed valve assembly, in accordance with one embodiment of the present invention.
Figure 10:
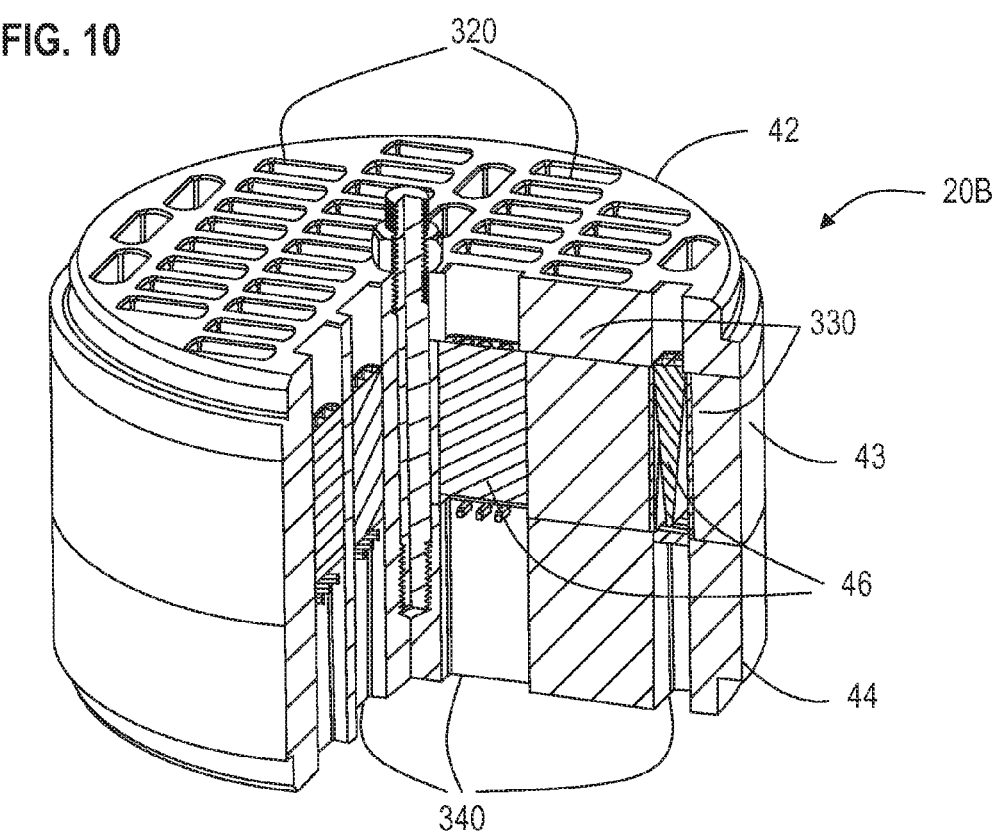
FIG. 10 is a perspective view of an exemplary modular reed valve assembly with a partial cross section in accordance with one embodiment of the present invention.

Exemplary modular reed valve assemblies 20 in accordance with certain embodiments of the present invention are depicted in FIGS. 3-5, 10-12, and 15. Generally these embodiments represent various modular reed valve assembly 20 configured as a discharge valve, while FIG. 10 represents a suction valve. As shown in FIGS. 3-4, the exemplary modular reed valve assembly 20 includes a seat plate 42 and a retainer plate 44. The seat and retainer plates, 42 and 44, may be coupled to one another via one or more studs 48 and nuts 50 or using some other suitable fastening means. It should be noted that in this embodiment the stud 48 and nut 50 are centrally located, in other embodiments, screws or stud/nuts may be employed along the periphery of the valve seat (in the case of a discharge valve) or the valve retainer (in the case of an inlet valve) such that they are captured by a cage used to locate the modular reed valve assemblies 20 in the recesses 18.

In this embodiment, the valve assembly 20 includes a seat plate 42 and a retainer plate 44 having a number of fluid passageways or ports 320 and 340, respectively, that allow a fluid, such as natural gas, to flow through the modular reed valve assembly 20. In this embodiment of the present invention, the seat plate 42 has a receiving cavity 330, downstream of each of the fluid ports 320, that locates and firmly secures a reed valve module (or modular reed valve) 46 within the modular reed valve assembly 20. In other embodiments of the invention, the receiving cavity 330 may be provided in the retainer plate 44, or distributed partially between the seat plate 42 and retainer plate 44, or there could be a separate plate, receiving cavity plate (see FIG. 10), sandwiched between the seat plate 42 and retainer plate 44 that has receiving cavities 330 in its entirety or partially. As discussed in greater detail below, the exemplary modular reed valve assembly 20 also includes one or a plurality of reed valve modules 46, located in the receiving cavity 330 and secured by the seat plate 42 and retainer plate 44.

Figure 5:
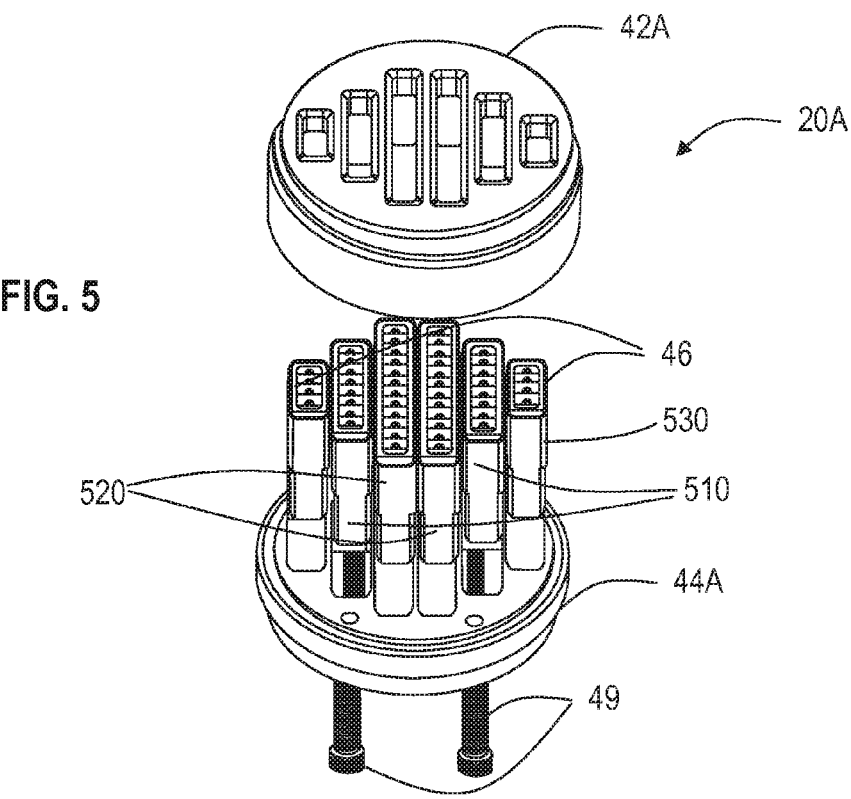
FIG. 5 is an exploded view of a modular reed valve assembly having modular reed valves of varying sizes in accordance with one embodiment of the present invention.

In some embodiments of the present invention, such as the embodiment illustrated in FIGS. 3-5, each flow port 320 leads into a single receiving cavity 330 that leads to a single exit flow port 340. The receiving cavity 330 is configured to locate only a single reed valve module 46 therein. As shown, in other embodiments, however, there may be one or more flow ports 320 that lead into a receiving cavity 330 that in turn leads into one or more exit flow ports 340. The receiving cavity 330 may in those embodiments receive multiple reed valve modules 46. Further, while certain embodiments of the modular reed valve assembly 20 include a plurality of reed valve modules 46, it should be noted that other embodiments may instead include only one reed valve module 46 in full accordance with the present disclosure. It should be noted that in other embodiments of the present invention, the seat plate 42, or retainer plate 44 may be integrated into the frame 14 of the machine in which the valve assembly is employed.

The reed valve modules 46 selectively control the flow of a fluid through the fluid port 320, through the reed valve module 46 and out through the port 340. The seat plate 42 and retainer plate 44 secure the reed valve modules 46 between them. The seat plate 42 may be formed from metal, fiber reinforced composite or some other suitable high-strength material. The retainer plate 44 and the receiving cavity plate have lower strength requirements, but may also be made from metal, fiber reinforced composite or plastic. It should be noted that in other embodiments, there may be provisions on the modular reed valve assembly, 20, to accommodate an unloading device, a clearance volume device or other devices that are located on valves in current practice.

An exemplary valve assembly, 20A, in accordance with certain embodiments of the present invention is depicted in FIG. 5. The valve assembly includes a seat plate 42A and a retainer plate 44A. The seat and retainer plates, 42A and 44A, are attached to one another by means of four cap screws 49 in this embodiment. Also in this embodiment, there are six modules in total, two modules 46 of one size, two modules 510 of another size, and the last two modules 520, of a third size. In other embodiments, there may be several different sizes of modules, they may be distributed asymmetrically in the valve and they need not be in pairs.

Figure 6:
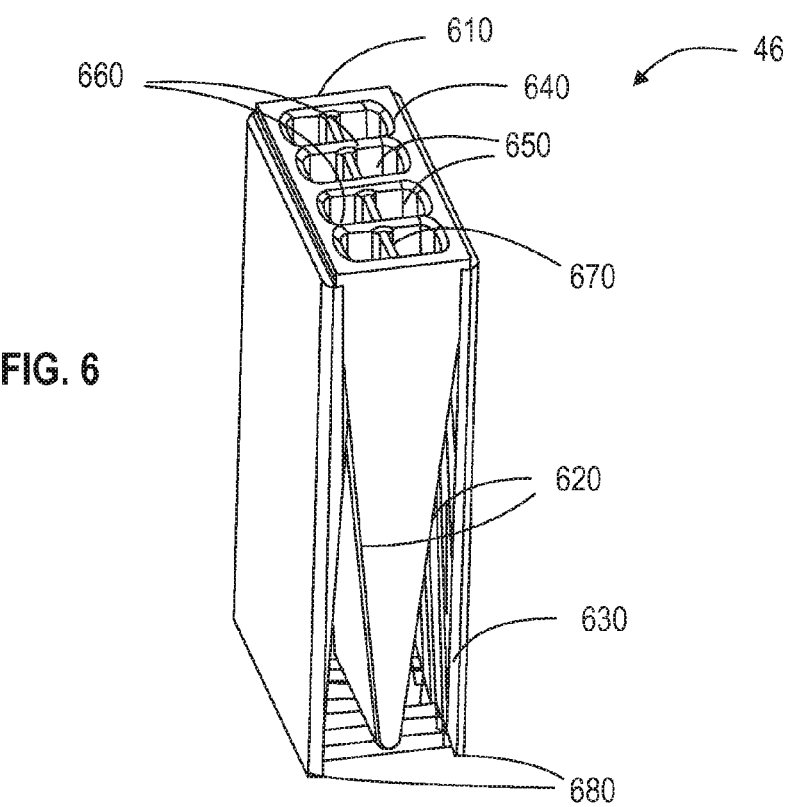
FIG. 6 is a perspective view of an exemplary reed valve sub-assembly module in accordance with one embodiment of the current invention.
Figure 7:
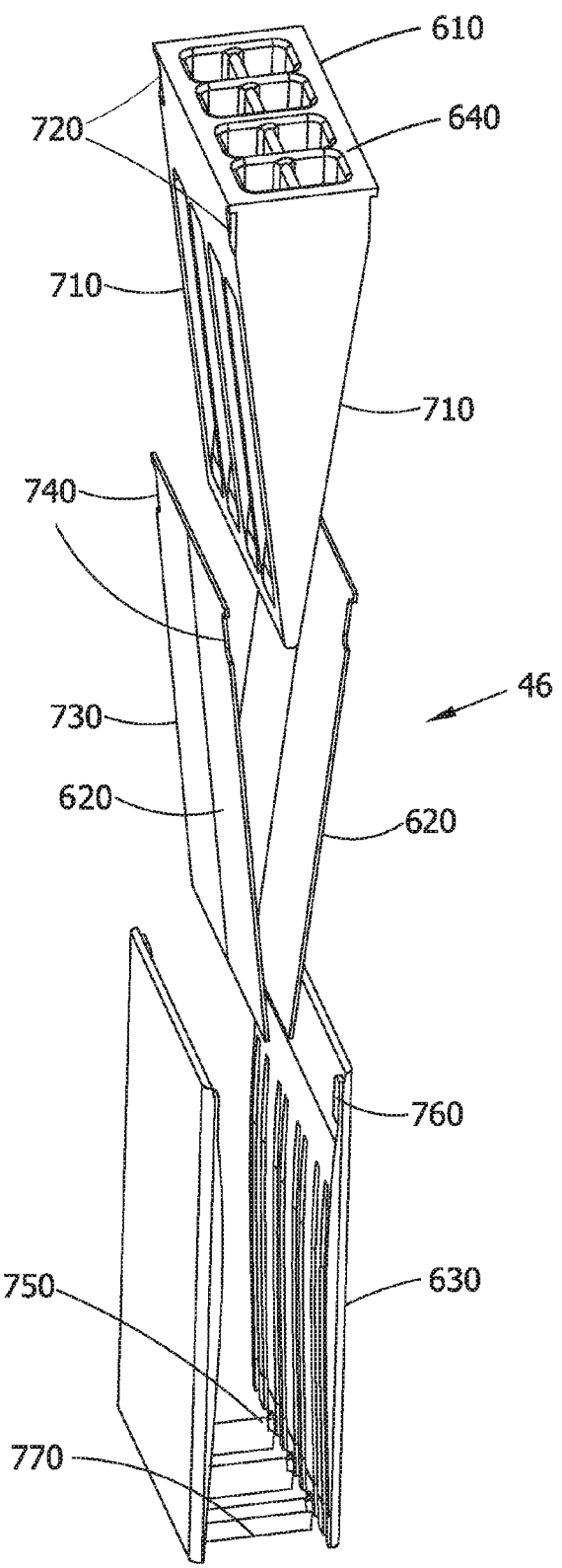
FIG. 7 is an exploded view of the reed valve module of FIG. 6 showing certain components of the sub-assembly in accordance with one embodiment of the present invention.
Figure 8:
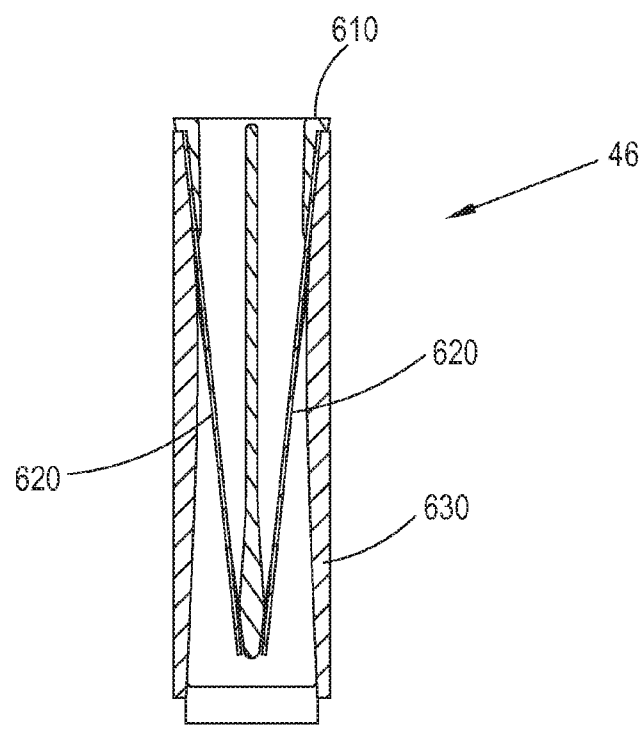
FIG. 8 is a cross-sectional view of the exemplary reed valve module of FIG. 6, depicting the petals in a closed position and in accordance with one embodiment of the present invention.

Exemplary reed valve modules 46 in accordance with certain embodiments of the present invention are depicted in FIGS. 6-8. FIG. 6 is a perspective view of the reed valve module 46. In certain embodiments of the current invention, such as that illustrated in the FIGS. 6-8, the reed valve module 46, includes a body 610, one or more petals 620, and may include a petal guard (or stopper) 630. In certain embodiments, the body 610 and/or guard 630 are made of plastic, with or without carbon or glass fibers, and is formed through a suitable manufacturing process, such as injection molding, compression molding, machining or another suitable process. The amount of fiber contained in the plastic is determined based on obtaining an optimum amount of strength for the valve body and impact absorption for the petals to increase the reliability of the valve. It should be noted, however, that certain applications may dictate that the body 610, and/or guard 630, be formed from metal or some other suitable high strength material through a suitable manufacturing process such as metal injection molding, casting, powder metallurgy or machining. When the body 610 is made of metal and the petals 620 are of metal, plastic inserts (not shown) may be used in the body 610 for the sealing face in order to soften the impact force. In other embodiments of the present invention, the body 610 and/or guard 630 may be made of metal with a relatively thick coating of plastic or elastomer. It is not necessary that the body 610 and the guard 630 be made of the same material. In one embodiment of the present invention, the reed valve petals 620, are made of stainless steel made from precision sheet strips using photo-chemical milling, stamping, water jet cutting, laser cutting, wire EDM, or other suitable manufacturing process. However, in other embodiments, the petals 620 may be made of steel, fiber reinforced composite or some other high fatigue strength, flexible material suitable for the application.

Figure 13:
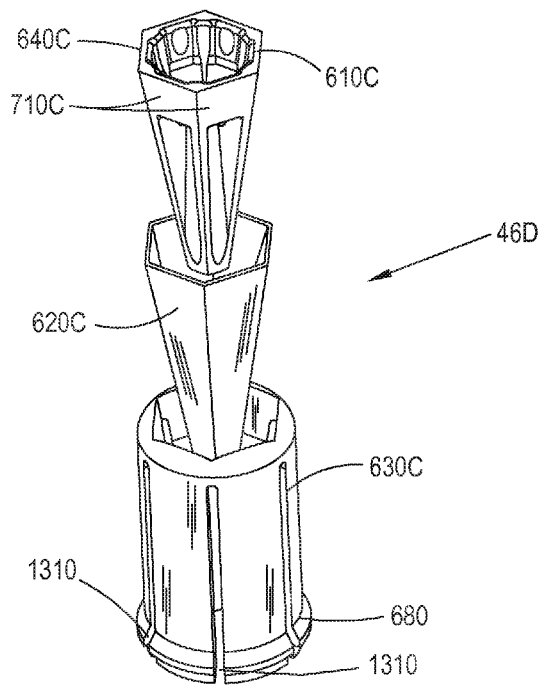
FIG. 13 is an exploded view of an exemplary modular reed valve with an internal securing mechanism in accordance with one embodiment of the present invention.

The body 610 includes a seat 640 that abuts against the seat plate 42 (not shown here) when the reed valve module 46 is assembled into the modular reed valve assembly 20. The body 610 may be divided into flow passages 650, by means of ribs 660 and 670 that also reinforce the body 610. The transverse ribs 660 also act to support the petals 620 when they are in the closed position and subject to high differential pressure. In certain embodiments of the present invention, there may be passages that are present in the ribs 660 and 670 that connect one or more flow passages. The flow passages 650 lead from the valve seat port 320 for this reed valve module 46 to one or more body seal faces 710. The body seal faces 710 are formed to be flat and at a small angle from the vertical so that the fluid that passes through the reed valve module 46 does not make any large angle turns in passing through it. In certain embodiments of the present invention, such as illustrated in FIGS. 6-8, there are two body seal faces 710, at an angle to the vertical for each body 610. However, in other embodiments there may be only one seal face 710 formed at an angle to the vertical. In other embodiments, there may be several faces as illustrated in FIG. 13. In certain other embodiments, the seal faces 710 may be vertical.

Corresponding to each body seal face 710, there are one or more valve petals 620 that lie flat against the body seal face 710 in the reed valve module 46 in the assembled state, essentially seating it. Each petal 620 has an initial portion that is used to secure it in the valve module and a latter portion that seals the body 610 when the pressure is greater on the exit port 340 and deflects to open up the body seal face 710 when the pressure is greater on the inlet fluid port 320. On the deflection side of the petals 620, there may be slits that divide the petals into separate sealing elements and allow it to independently seal different flow passages 650 in the body 610. On the secured portion of the petals 620, there may be one or more cut outs 740 that engage with protrusions 760 on the guard 630 and corresponding slot 720 in the body 610.

The petal guard 630 has an inside surface, the initial portion of which is contoured to capture the body 610 and petals 620 and the latter portion to provide a surface for the petal 620 to impact against in its fully open state. Grooves 750 may be provided on the latter portion of the guard 630 inside surface to reduce the sticktion effects found in valves where they may be liquids present. In certain embodiments of this invention, as shown in the illustrations in FIGS. 6-9, the guards may have a plurality of trap members 770 at the bottom. These trap members 770 preferably prevent any large pieces that may break off from the reed valve module 46, in particular pieces of the petal 620, from escaping the reed valve module 46 and in particular, migrating to the cylinder 12 and causing damage. The bottom 780 of the petal guard 630 is designed to be larger than the flow port 340 in the retainer plate 44 so that the bottom 780 abuts against, the retainer plate 44 and holds the reed valve module 46 within the modular reed valve assembly 20. In other embodiments of the petal guard 630, there may be no trap members 770. In certain embodiments of the present invention, the petal guard 630 may have side walls connecting the contoured walls of the body seal faces 710. In other embodiments, the petal guard 630 may have neither trap members 770 nor side walls. In this case the petal guard 630 is held in position when the reed valve module 46 is placed in the receiving cavity 330. In certain embodiments of the present invention, instead of the bottom of the guard 780 being used to secure the reed valve module 46 within the modular reed valve assembly 20, a lip 530 (shown in FIG. 5) may be provided on the outer wall of the guard 630 and/or the body 610 (not shown); the receiving cavity 330 may be shaped so that this lip 530 engages with a step in the cavity 330 securing the reed valve module 46 in the modular reed valve assembly 20. Other or additional attachment mechanisms, however, could be provided in full accordance with the present techniques.

The cutouts 740, protrusions 760 and slots 720 locate the petal 630 against the seal face and additionally, in conjunction with the friction force, act as a positive restraint preventing the petal 630 from dropping. In other embodiments of the present invention, the protrusion 760 may be on the body 610 and the corresponding slot 720 on the guard 630. In one embodiment of the present invention, as illustrated in the FIGS. 6-8, for body seal faces 710 that are at an angle, the petals 630, are wedged between the body 610, and the petal guard 630 in the reed valve module 46. In certain other embodiments, where the seal face 710 is vertical, the petals 620 are held in place in the reed valve module 46 by means of the clamping force produced when the module is pressed into the receiving cavity 330. This clamping force is induced by an interference fit between the reed valve module 46 and the walls of the receiving cavity 330 or by suitably shaping the reed valve module 46 and recess cavity 330 walls to provide the necessary clamping force. In certain other embodiments, the petal guard 630 is eliminated from the reed valve module 46. Instead, the inner walls of the recess 330 are contoured similar to the inner walls of the petal guard 630 so that it provides the same function (see FIGS. 11-12).

Advantageously, in the embodiment illustrated in FIGS. 3-8, the modular reed valve assembly 20 is configured to facilitate efficient servicing or repair. Notably, all the wear is preferably contained within the reed valve module 46 that houses: the petals 620, which may wear due to fatigue and impact, the body 610, the seal face 710, which is subject to repeated impacts from the petal 620, and the guard 630, which is also subject to impacts from the petal 620 during opening of the valve. The preferred method of servicing of the modular reed valve assembly 20 is to simply replace all the reed valve modules 46 at the pre-established maintenance time. There is no machining required for the valve seat plate 42 or valve retainer plate 44 as these components should not wear, unlike in the case with existing plate, poppet, channel and reed valves. The present invention allows the modules to come pre-assembled and tested for quality direct from the factory and thus eliminates the need for complex testing equipment to test the assembled modular reed valve assembly 20 after repair. The refurbishing and repair of these modular reed valves assemblies 20 can thus be done in the field, substantially reducing the cost of repair and the down time of the equipment. The modular design substantially eliminates the need to replace the expensive valve seat plate 42 and valve retainer plate 44, making these valves very cost effective over the life of the machine. In existing designs for poppet, plate, ring, channel and reed valves, the seat plate 42 and retainer plate 44 or guard typically need to be replaced after it has been refurbished a couple of times. In a non-preferred embodiment, it is also possible to replace components of the reed valve module 46 in the field, specifically the petals 620, the guard 630 or the body 610.

The working of the valve is made clear by observing the FIG. 3 and the cross-section through a module FIG. 8. When the pressure of the fluid above the seat plate 42 in the modular reed valve assembly 20 is higher than the pressure below the retainer plate 44, the differential pressure across the petal 620 in the reed valve module 46 causes the petal 620 to deflect and sets the reed valve module 46 and therefore the modular reed valve assembly 20 in an open state. Fluid moves from above the seat plate 42, through the fluid ports 320 through the module body 610 and out through the trap members 770 of the guard 630, and finally through the fluid ports 340 in the retainer plate 44 into the lower pressure zone. When the pressure on either side of the modular reed valve assembly 20 equalizes, the petals 620 close, effectively sealing off the module body 610. In the closed position, the modular reed valve assembly 20 does not allow flow of fluid from below the retainer plate 44 to above the seat plate 42, even when the pressure below the retainer plate 44 is substantially higher than the pressure above the seat plate 42.

Figure 9:
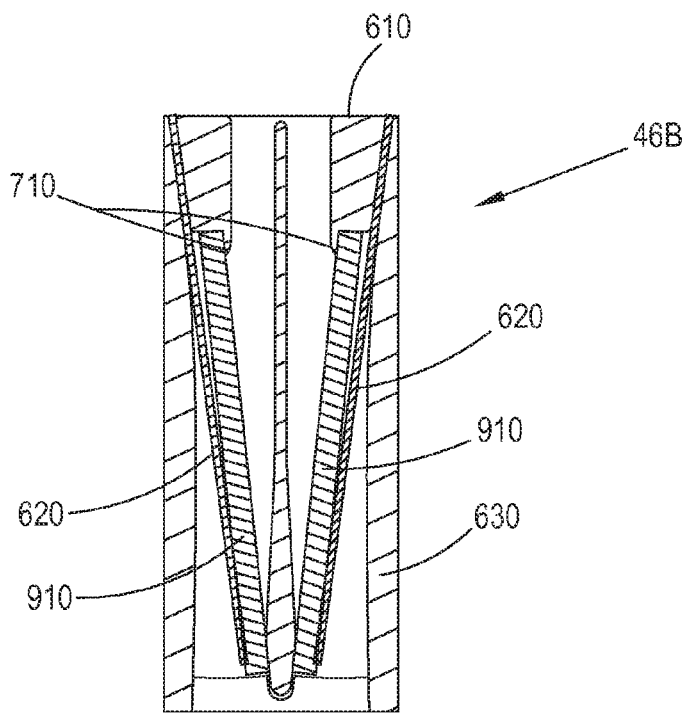
FIG. 9 is a cross-sectional view of a modular reed valve composed of inner petals in addition to outer petals in accordance with one embodiment of the present invention.

An exemplary reed valve module in accordance with certain embodiments of the present invention is depicted in FIG. 9. This embodiment of the reed valve module 46B includes a set of inner petals 910 in addition to the outer petals 620. In the embodiment illustrated in FIG. 9, the inner petals 910 are pressed against the seal face 710 by the outer petals 620. In this embodiment of the current invention, only the outer petals are clamped to the body 610 by the guard 630.

An exemplary modular reed valve assembly 209 in accordance with certain embodiments of the present invention is depicted in FIG. 10. In this embodiment of the present invention, the receiving cavities 330 are located in a separate plate 43 that is sandwiched between the seat plate 42 and the retainer plate 44. Other features of FIG. 10 may be found in the descriptions of FIGS. 3-8.

Figure 11:
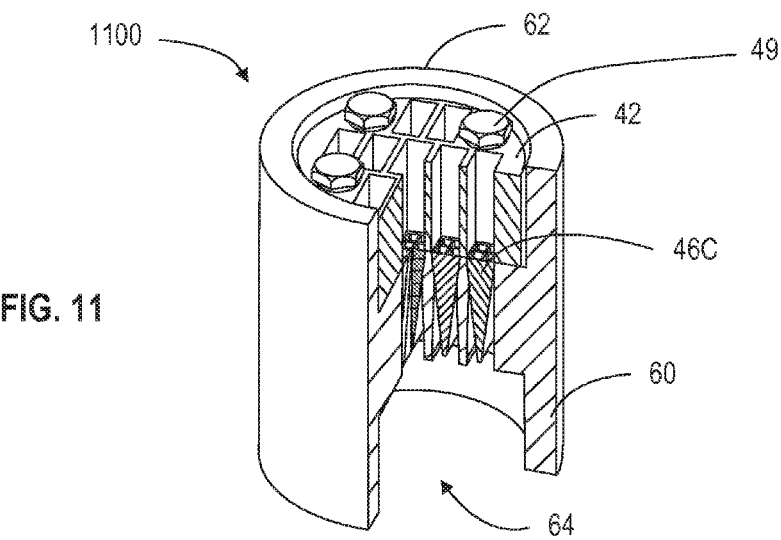
FIG. 11 is a perspective view, with a partial cross section, of a device using modular reed valves, where a portion of the reed valve assembly is integrated into the structure of the device itself.
Figure 12:
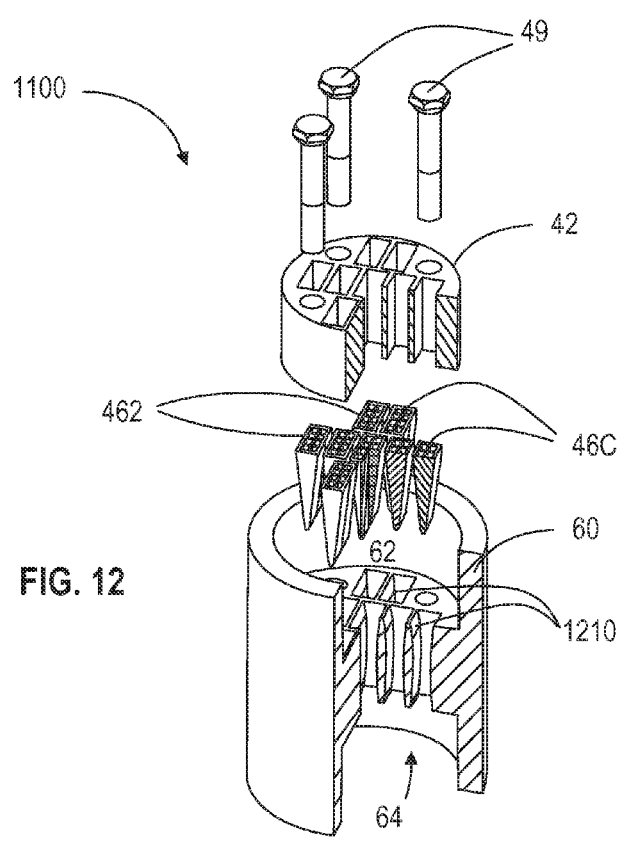
FIG. 12 is an exploded view, with partial cross sections, of the device illustrated in FIG. 11 showing the certain components of the device including the reed valve modules.

A perspective view of a device with a partial cross section is shown in FIG. 11 and its exploded view is illustrated in FIG. 12. The device 1100 incorporates a modular reed valve assembly 20 in accordance with one embodiment of the present invention. The device 1100, that could represent a compressor cylinder, engine or a process flow pipe, for instance, consists of a frame 60 that is divided into two volume regions 62 and 64. A modular reed valve assembly 20 is incorporated in the device that allows the fluid to flow from region 62 to 64, but not the other way. In these embodiments of the present invention, the reed valve modules 46C, do not have petal guards 630 as part of the reed valve module 46C. The reed valve modules 46C are located in receiving cavities 330 that are an integral part of the frame 60. In effect, in this embodiment, the retainer plate 44 carries the receiving cavities 330 and the retaining plate 44 is integrated into the frame 60. Moreover, the inner surface of the receiving cavities 330 is contoured to serve the same function as the inner surface of the petal guard 630 shown in FIGS. 6-9. That is, these embodiments clamp the petals 620 to the body 610 and prevent the body 610 from falling out of the cavity 330, and they limit the excursion of the petals 620 when it opens. The reed valve module 46C is secured in the receiving cavity 1210 by means of a seat plate 42 by means of a fastening means such as screws 49.

Figure 14:
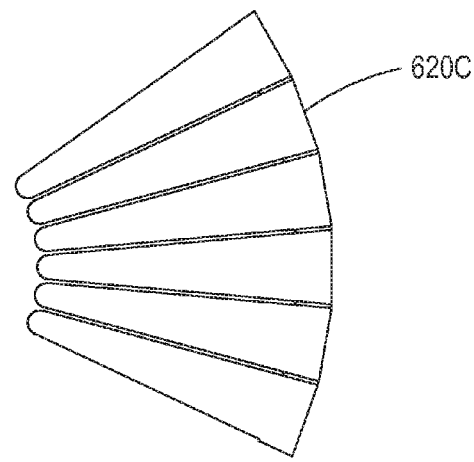
FIG. 14 is top view of a single valve petal in an unbent state that covers multiple sealing faces in accordance with embodiments of the present invention, such as shown in FIG. 13.

An exemplary reed valve module sub-assembly 46D, in accordance with certain embodiments of the present invention is depicted in FIG. 13, in the exploded state. The valve body, 610C, has a seat face, 640C and six sealing faces, 710C, in this embodiment. The reed valve module 46D may consist of one or more valve petals 620C that seal the individual sealing faces, 710C. In this embodiment, a single petal, 620C, depicted in the unbent state in FIG. 14, and formed into a suitable shape in the final state, covers all sealing faces, 710C, of the valve body, 610C, in the reed valve module sub-assembly 46D. The valve body 610C and petals 620C are secured in the petal guard/housing, 630C, when the reed valve module sub-assembly, 46C, is assembled into the modular reed valve assembly, 20D.

In FIG. 13, one embodiment of the petal guard/housing, 630C, is of a snap fit design so as to eliminate the retainer (screw/nut, etc.) in the modular reed valve assembly 20D in which these modules are assembled. The slits, 1310, and the protrusion, 680, enable the reed valve module sub-assemblies 46D, to be assembled into the seat, 42D, of the valve assembly, 20D, in FIG. 15, without the need of a retainer, stud(s) or nut(s).

Figure 15:
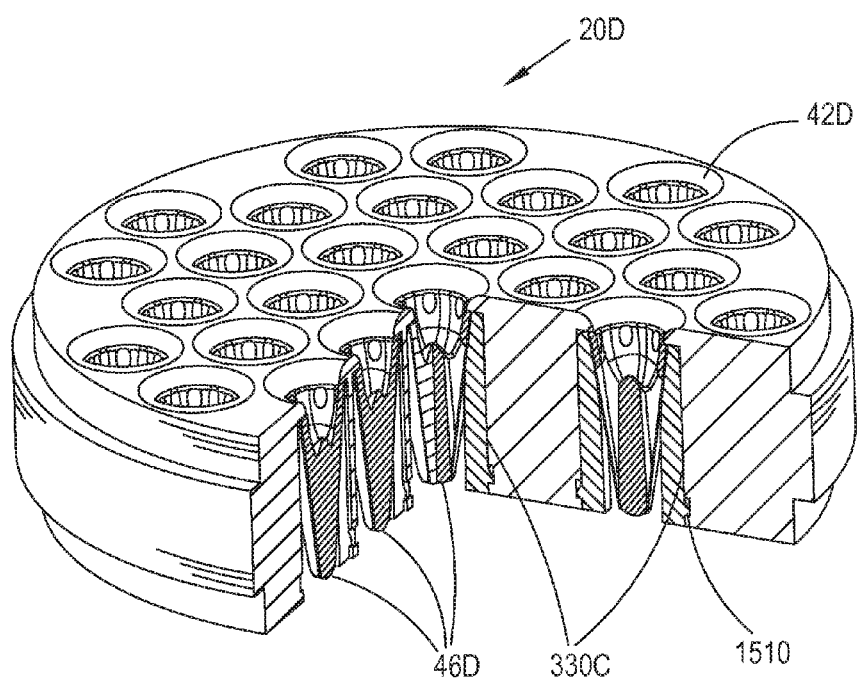
FIG. 15 is a partial cut-away view of an exemplary modular reed valve assembly showing the internal securing mechanism from FIG. 13 in accordance with one embodiment of the present invention, eliminating the retainer plate and fasteners.

An exemplary modular reed valve assembly 20D, in accordance with certain embodiments of the present invention is depicted in FIG. 15. The retainer, stud(s) and nut(s) that were shown in the other embodiments, 20 and 20B, have been eliminated by the use of a snap fit reed valve module sub-assembly 46D, one embodiment of which, is shown in FIG. 13. Each of the receiving cavities, 330C, in the seat, 42D, have a groove, 1510, cut into it to receive the protrusions, 680, on the outside surface of the petal guards, 630C, in the snap-fit design reed valve module sub-assemblies 46D.

Generally, speaking for most embodiments of the present invention, it will be appreciated that during passage of the fluid through the modular reed valve assembly 20, the fluid is travelling in essentially a straight path with very little losses due to turning of the fluid. This is unlike the case in current designs of compressor plate, poppet, channel, ring and reed valves where the fluid essentially has to make two right angle turns to go past the sealing element resulting in large valve losses. Additionally, the compact design of the reed valve module 46 and the flow characteristics of this design, allow a more effective coverage of an available valve area with fluid flow area when utilizing the illustrated embodiments of this invention resulting in a more efficient valve when compared to existing plate valves, ring valves, poppet valves, channel valves and reed valves.

Additionally, it will be appreciated that in the illustrated embodiments of the present invention, if a foreign body, such as rust, passes through the modular reed valve assembly 20, the damage is limited to one or two flow paths 650 within a single reed valve module 46 of the modular reed valve assembly 20. The flow path provided by each reed valve module 46 is independent of that of another reed valve module 46. Since a typical modular reed valve assembly 20, may consist of several reed valve modules 46, the modular reed valve assembly 20 may continue to operate effectively until a planned shutdown allows the repair of the affected reed valve module(s) 46 saving money for the operator. However, in the case of existing valve designs, such an incident would lead to a more urgent repair situation. In the case of plate valves that have only one sealing element the damage would require immediate shutdown and repair of the machine in which the valve is installed.

In one embodiment, the petal guards are composed of a plastic with a predetermined amount of fiber, 0-25%, to provide an optimum combination of strength for the operating conditions and the ability to absorb impacts and diffuse the energy of the petals. In one embodiment, the reed valve module body is composed of a plastic with a predetermined amount of fiber, 0-60%, to provide an optimum combination of strength for the body at operating conditions and an ability to absorb impacts of the single or plurality of reed petals. In another embodiment, the reed valve body is made of a metal, formed through a metal injection molding process. The petals may be made of fiber reinforced composites to improve reliability. The petal guards may be metal, formed through a metal injection molding process.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims.

The invention claimed is:

1. A reed valve module, comprising:
   a module body comprising a seating surface that surrounds an entire periphery of a flow inlet, one or more first sealing faces on an outer surface of a first side of the module body and one or more second sealing faces on an outer surface of a second side of the module body, and one or more fluid flow passages, each of the one or more fluid flow passages leading from the flow inlet at the seating surface to a flow outlet passing through one of the one or more first and second sealing faces, wherein one of the one or more first and second sealing faces completely surrounds and encloses a respective flow outlet passing therethrough, and wherein an inside surface of the module body defines a cavity;
   a plurality of transverse ribs inside of the module body and reinforcing the cavity, wherein at least one rib of the plurality of transverse ribs extends across the cavity from the first side of the module body to the second side of the module body and has an exposed end surface that is positioned proximate and substantially aligned with one of the one or more first and second sealing faces;
   a plurality of lateral ribs positioned inside of and reinforcing the module body cavity, each of the plurality of lateral ribs extending laterally between and laterally supporting an adjacent pair of the plurality of transverse ribs; and
   one or more reed petals that are adapted to be positioned on the outer surface of the module body, wherein each of the one or more reed petals is adapted to be positioned over a respective one of the one or more first and second sealing faces and over the exposed end surface of at least one rib of the plurality of transverse ribs, to extend across and cover an entirety of at least one flow outlet, and to close off fluid flow through the at least one flow outlet when the respective reed petal contacts and seals against the respective one of the one or more first or second sealing faces surrounding the at least one flow outlet while the respective reed petal is in a closed position, wherein the respective one of the one or more first or second sealing faces and the exposed end surface of the at least one rib are adapted to support the respective reed petal when the respective reed petal is in said closed position, and wherein a spacing between each of the plurality of transverse ribs is adapted to enable each of the one or more reed petals to withstand a differential pressure acting thereon when the respective reed petal is in said closed position.

2. The reed valve module of claim 1, wherein the exposed end surface of each of the plurality of transverse ribs is flush with one of the one or more first and second sealing faces.

3. The reed valve module of claim 1, wherein the one or more first and second sealing faces on the module body are each at an angle that is substantially perpendicular to the seating surface.

4. The reed valve module of claim 1, wherein at least some of the plurality of transverse ribs extending across the cavity divide the cavity into a plurality of separate fluid flow passages, each of the separate fluid flow passages being adapted to direct a flow of fluid from the seating surface to a respective flow outlet through one of the one or more first and second sealing faces.

5. The reed valve module of claim 1, wherein a portion of each of the one or more reed petals is adapted to positively engage a portion of a receiving recess of a valve assembly when the module body and the one or more reed petals are disposed within the receiving recess and secured by a seat plate within the valve assembly.

6. The reed valve module of claim 1, wherein the one or more first and second sealing faces on the outer surface of the module body comprises a plurality of adjacent sealing faces, wherein the one or more reed petals comprises a plurality of contiguous reed petals, wherein a portion of each of the plurality of contiguous reed petals is attached to a corresponding portion of an adjacent one of the plurality of contiguous reed petals, and wherein each of the plurality of contiguous reed petals covers at least one of the plurality of adjacent sealing faces of the module body.

7. The reed valve module of claim 1, wherein the first side of the module body is opposite the second side of the module body, a first flow outlet passes through the one or more first sealing faces, and a second flow outlet passes through the one or more second sealing faces, the module body further comprising:
a third sealing face on a third side of the module body that is adjacent to the first side, the third sealing face having a third flow outlet passing therethrough;
a fourth sealing face on a fourth side of the module body that is opposite the third side, the fourth sealing face having a fourth flow outlet passing therethrough;
a fifth sealing face on a fifth side of the module body that is adjacent to the third side, the fifth sealing face having a fifth flow outlet passing therethrough; and
a sixth sealing face on a sixth side of the module body that is opposite the fifth side, the sixth sealing face having a sixth flow outlet passing therethrough.

8. The reed valve module of claim 1, wherein each of the one or more lateral ribs has a first end proximate the seating surface of the module body and a second end proximate an end of the module body that is opposite of the seating surface.

9. The reed valve module of claim 1, further comprising a modular housing, the modular housing comprising one or more walls positioned opposite the module body from the one or more reed petals, wherein each of the one or more walls is adapted to hold at least one of the one or more reed petals against the module body.

10. The reed valve module of claim 9, wherein the modular housing comprises a protrusion sized to fit into a groove formed in a receiving recess of a modular reed valve assembly, the protrusion being adapted to secure the reed valve module when inserted into the receiving recess.

11. The reed valve module of claim 9, wherein the modular housing comprises a snap-fit mechanism that is adapted to secure the reed valve module in a receiving recess of a valve assembly.

12. The reed valve module of claim 9, wherein an upper surface of the at least one wall of the modular housing is adapted to frictionally clamp at least one of the one or more reed petals to a corresponding surface of the module body when the module body is disposed within a receiving recess and is secured by a seat plate within a valve assembly.

13. The reed valve module of claim 9, wherein the one or more reed petals in the module, the one or more walls of the modular housing, and the one or more first and second sealing faces of the module body have juxtaposed cut outs and projections that are adapted to positively engage each other when the reed valve module is assembled and to hold the one or more reed petals positively against the module body by the one or more walls of the modular housing.

14. The reed valve module of claim 9, wherein an inner surface of the one or more walls of the modular housing is adapted to act as a petal guard for the one or more reed petals.

15. The reed valve module of claim 14, wherein the inner surface of the one or more walls of the modular housing that is adapted to act as a petal guard has a contoured surface that is adapted to reduce impact forces on the one or more reed petals when each respective one of the one or more reed petals is opened during operation of the reed valve module.

16. The reed valve module of claim 15, wherein a lower portion of the inner surface of the one or more walls of the modular housing that is adapted to act as a petal guard is adapted to prevent stiction of any of the one or plurality of reed petals that are opened during operation of the reed valve module.

17. A reed valve module, comprising:
a module body, the module body comprising:
one or more fluid inlets;
a seating surface surrounding the one or more fluid inlets;
one or more sealing faces on an outer surface of the module body;
one or more fluid outlets passing through each of the one or more sealing faces, the one or more fluid outlets comprising a first fluid outlet through a first side of the module body and a second fluid outlet through a second side of the module body that is opposite of the first side;
one or more fluid flow passages, each one of the one or more fluid flow passages leading from at least one of the one or more fluid inlets to at least one of the one or more fluid outlets, wherein one of the one or more sealing faces completely surrounds and encloses one of the one or more fluid outlets passing therethrough; and one or more spaced-apart ribs separating each of the one or more fluid outlets into a respective plurality of spaced-apart fluid outlet ports, wherein each of the respective one or more spaced-apart ribs has an exposed outside support surface that is substantially flush with one of the one or more sealing faces and an inside surface that is substantially flush with an inside surface of the module body; and one or more reed petals that are adapted to be positioned on the outer surface of the module body, wherein each of the one or more reed petals is adapted to be positioned over at least one of the one or more sealing faces and over the exposed outside support surface of at least one of the one or more spaced-apart ribs, wherein the respective sealing face and the exposed outside support surface of at least one of the one or more spaced-apart ribs are adapted to support the respective reed petal when the respective reed petal is in a closed position, and wherein a spacing between the at least one of the one or more spaced-apart ribs and an adjacent one of the one or more sealing faces is adapted to enable one of the one or more reed petals to withstand a differential pressure acting thereon when the respective reed petal is in said closed position.

18. The reed valve module of claim 17, wherein each of the one or more reed petals is adapted to extend across and cover an entirety of at least one of the one or more fluid outlets and to close off fluid flow through the at least one of the one or more fluid outlets when a respective one of the one or more reed petals contacts and seals against a respective one of the one or more sealing faces surrounding the at least one of the one or more fluid outlets while the respective one of the one or more reed petals is in said closed position.

19. The reed valve module of claim 17, wherein a portion of each of the one or more reed petals is shaped to positively engage a portion of a receiving recess of a valve assembly when the module body and the one or more reed petals are disposed within the receiving recess and are secured by a seat plate within the valve assembly.

20. A reed valve module, comprising:
a module body having an inside surface that defines a module body cavity, wherein the module body comprises:
  a first fluid flow outlet through a first side of the module body;
  a first sealing face on an outside surface of the first side of the module body, the first sealing face surrounding an entire periphery of the first fluid flow outlet;
  a second fluid flow outlet through a second side of the module body;
  a second sealing face on an outside surface of the second side of the module body, the second sealing face surrounding an entire periphery of the second fluid flow outlet;
  a fluid flow inlet through a third side of the module body;
  a seating surface on an outside surface of the third side of the module body, the seating surface surrounding an entire periphery of the fluid flow inlet;
  a plurality of spaced-apart transverse ribs reinforcing and extending across the module body cavity from the first side to the second side, at least a first rib of the plurality of spaced-apart transverse ribs having a first exposed rib end surface that is positioned proximate and substantially aligned with the first sealing face and a second exposed rib end surface that is positioned proximate and substantially aligned with the second sealing face, wherein the plurality of spaced-apart transverse ribs divide the module body into a plurality of flow passages, at least one of the plurality of flow passages providing fluid communication between the fluid flow inlet and at least one of the first and second fluid flow outlets; and
  a plurality of lateral ribs positioned inside of and reinforcing the module body cavity, each of the plurality of lateral ribs extending laterally between and laterally supporting an adjacent pair of the plurality of transverse spaced-apart ribs;
a first reed petal that is adapted to be positioned over the first sealing face and over the first exposed rib end surface, wherein the first sealing face and the first exposed rib end surface are adapted to support the first reed petal when the first reed petal is in a closed position; and
a second reed petal that is adapted to be positioned over the second sealing face and over the second exposed rib end surface, wherein the second sealing face and the second exposed rib end surface are adapted to support the second reed petal when the second reed petal is in a closed position.

21. The reed valve module of claim 20, wherein the first and second exposed rib end surfaces are flush with a respective first or second sealing face.

22. The reed valve module of claim 20, wherein the first and second reed petals are each adapted to extend across and cover an entirety of a respective first or second fluid flow outlet and to close off fluid flow through the respective first or second fluid flow outlet when the respective first or second reed petal contacts and seals against the respective first or second sealing face surrounding the respective first or second fluid flow outlet while the respective first or second reed petals is in said closed position.

23. A method of assembling a reed valve module, the method comprising:
obtaining one or more reed petals;
obtaining a module body, the module body comprising:
  a seating surface that surrounds an entire periphery of a flow inlet;
  one or more first sealing faces on an outer surface of a first side of the module body;
  one or more second sealing faces on an outer surface of a second side of the module body;
  one or more fluid flow passages, each of the one or more fluid flow passages leading from the flow inlet at the seating surface to a flow outlet passing through one of the one or more first and second sealing faces, wherein one of the one or more first and second sealing faces completely surrounds and encloses a respective flow outlet passing therethrough, and wherein an inside surface of the module body defines a cavity;
  a plurality of transverse ribs inside of the module body and reinforcing the cavity, wherein at least one rib of the plurality of transverse ribs extends across the cavity from the first side of the module body to the second side of the module body and has an exposed end surface that is positioned proximate and substantially aligned with one of the one or more first and second sealing faces, and wherein a spacing between each of the plurality of transverse ribs enables a reed petal that is positioned over one of the one or more first and second sealing faces to withstand a differential pressure acting thereon when the reed petal is in a closed position; and a plurality of lateral ribs positioned inside of and reinforcing the module body cavity, each of the plurality of lateral ribs extending laterally between and laterally supporting an adjacent pair of the plurality of transverse ribs; and positioning one of the one or more reed petals over a respective one of the one or more first and second sealing faces and over the exposed end surface of at least one rib of the plurality of transverse ribs so that the respective reed petal extends across and covers an entirety of at least one flow outlet, closes off fluid flow through the at least one flow outlet when the respective reed petal contacts and seals against the respective one of the one or more first or second sealing faces surrounding the at least one flow outlet while the respective reed petal is in a closed position, and is supported by the respective one of the one or more first or second sealing faces and the exposed end surface of the at least one rib when the respective reed petal is in said closed position.

24. The method of claim 23, wherein the exposed end surface of each of the plurality of transverse ribs is flush with one of the one or more sealing faces.

25. The method of claim 23, further comprising obtaining a modular housing and positioning the module body and at least said one of the one or more reed petals inside of the modular housing.

26. A reed valve assembly, comprising:
a seat plate comprising one or more fluid conduits;
one or more receiving recesses, wherein each of the one or more receiving recesses is positioned proximate at least one of the one or more fluid conduits; and
one or more reed valve modules sized to fit within each of the one or more receiving recesses and adapted to receive a fluid flow from a respective one of the one or more fluid conduits, wherein each of the one or more reed valve modules comprises:
a module body comprising a seating surface that surrounds an entire periphery of a flow inlet, one or more first sealing faces on an outer surface of a first side of the module body and one or more second sealing faces on an outer surface of a second side of the module body, and one or more fluid flow passages, each of the one or more fluid flow passages leading from the flow inlet at the seating surface to a flow outlet passing through one of the one or more first and second sealing faces, wherein one of the one or more first and second sealing faces completely surrounds and encloses a respective flow outlet passing therethrough, and wherein an inside surface of the module body defines a cavity;
a plurality of transverse ribs inside of the module body and reinforcing the cavity, wherein each respective rib of the plurality of transverse ribs extends across the cavity from the first side of the module body to the second side of the module body and has an exposed end surface that is positioned proximate and substantially aligned with one of the one or more first and second sealing faces;
a plurality of lateral ribs positioned inside of and reinforcing the module body cavity, each of the plurality of lateral ribs extending laterally between and laterally supporting an adjacent pair of the plurality of transverse ribs; and one or more reed petals that are positioned on the outer surface of the module body, wherein each of the one or more reed petals is positioned over a respective one of the one or more first and second sealing faces and over the exposed end surface of at least one rib of the plurality of transverse ribs, to extend across and cover an entirety of at least one flow outlet, and to close off fluid flow through the at least one flow outlet when the respective reed petal contacts and seals against the respective one of the one or more first or second sealing faces surrounding the at least one flow outlet while the respective reed petal is in a closed position, wherein the respective one of the one or more first or second sealing faces and the exposed end surface of the at least one rib support the respective reed petal when the respective reed petal is in said closed position, and wherein a spacing between each of the plurality of transverse ribs enables each of the one or more reed petals to withstand a differential pressure acting thereon when the respective reed petal is in said closed position.

27. The reed valve assembly of claim 26, wherein the exposed end surface of each of the plurality of transverse ribs is flush with one of the one or more first and second sealing faces.

28. The reed valve assembly of claim 26, wherein the seat plate is an integral part of a separate structure.

29. The reed valve assembly of claim 26, wherein each of the one or more reed valve modules is held into each of the one or more receiving recesses by the seat plate and secured by one or more fasteners.

30. The reed valve assembly of claim 26, wherein the one or more receiving recesses are located within the seat plate, the reed valve assembly further comprising a retainer plate that secures the one or more reed valve modules in the reed valve assembly by the use of one or more fasteners.

31. The reed valve assembly of claim 26, wherein the one or more receiving recesses are located within a separate structure that is sandwiched between the seat plate and a retainer plate and held together by one or more fasteners.

32. The reed valve assembly of claim 26, wherein the one or more receiving recesses are located within a retainer plate and the seat plate secures the one or more reed valve modules in the reed valve assembly by the use of one or more fasteners.

33. The reed valve assembly of claim 26, wherein the one or more receiving recesses are located within the seat plate, and wherein each of the one or more reed valve modules are held in a respective one of the one or more receiving recesses by a snap-fit mechanism.

34. The reed valve assembly of claim 26, further comprising one or more sets of the one or more reed valve modules, wherein each set of the one or more reed valve modules has a different set of dimensions.

35. The reed valve assembly of claim 26, 29, 30, 32, or 31, wherein walls of each of the one or more receiving recesses include a contour that secures the one or more reed petals of each of the one or more reed valve modules to a respective module body when the respective module body is disposed within a respective receiving recess and secured in the reed valve assembly.

36. The reed valve assembly of claim 32, wherein the retainer plate is an integral part of a separate structure.

37. A method of assembling a reed valve assembly, the method comprising:
obtaining one or more reed valve modules, each of the one or more reed valve modules comprising:

a module body comprising a seating surface that surrounds an entire periphery of a flow inlet, one or more first sealing faces on an outer surface of a first side of the module body and one or more second sealing faces on an outer surface of a second side of the module body, and one or more fluid flow passages, each of the one or more fluid flow passages leading from the flow inlet at the seating surface to a flow outlet passing through one of the one or more first and second sealing faces, wherein one of the one or more first and second sealing faces completely surrounds and encloses a respective flow outlet passing therethrough, and wherein an inside surface of the module body defines a cavity;

a plurality of transverse ribs inside of the module body and reinforcing the cavity, wherein each respective rib of the plurality of transverse ribs extends across the cavity from the first side of the module body to the second side of the module body and has an exposed end surface that is positioned proximate and substantially aligned with one of the one or more first and second sealing faces;

a plurality of lateral ribs positioned inside of and reinforcing the module body cavity, each of the plurality of lateral ribs extending laterally between and laterally supporting an adjacent pair of the plurality of transverse ribs; and one or more reed petals that are positioned on the outer surface of the module body, wherein each of the one or more reed petals is positioned over a respective one of the one or more first and second sealing faces and over the exposed end surface of at least one rib of the plurality of transverse ribs, to extend across and cover an entirety of at least one flow outlet, and to close off fluid flow through the at least one flow outlet when the respective reed petal contacts and seals against the respective one of the one or more first or second sealing faces surrounding the at least one flow outlet while the respective reed petal is in a closed position, wherein the respective one of the one or more first or second sealing faces and the exposed end surface of the at least one rib support the respective reed petal when the respective reed petal is in said closed position, and wherein a spacing between each of the plurality of transverse ribs enables each of the one or more reed petals to withstand a differential pressure acting thereon when the respective reed petal is in said closed position;

obtaining a structure comprising one or more receiving recesses that are adapted to be positioned proximate one or more respective fluid conduits; and inserting one of the one or more reed valve modules into a respective receiving recess of the one or more receiving recesses so as to position the seating surface of each of the one or more reed valve modules to receive a fluid flow from a respective one of the one or more fluid conduits.

38. The method of claim 37, wherein the exposed end surface of each of the plurality of transverse ribs is flush with one of the one or more first and second sealing faces.

39. The method of claim 37, wherein at least one of the one or more reed valve modules and at least one of the one or more receiving recesses in the structure includes one or more fasteners, the method further comprising fitting the fastener of the reed valve module into the fastener of the respective receiving recess to secure the one or more reed valve modules.

40. The method of claim 37, wherein the structure comprising the one or more receiving recesses is a retainer plate of the reed valve assembly, the reed valve assembly further comprising a seat plate that comprises the one or more fluid conduits, at least one of the one or more fluid conduits of the seat plate being positioned proximate one of the one or more receiving recesses so as to direct said fluid flow to a seating surface of a respective one of the one or more reed valve modules.

41. The method of claim 37, wherein the structure comprising the one or more receiving recesses is a seat plate of the reed valve assembly, the seat plate further comprising the one or more fluid conduits, at least one of the one or more fluid conduits being positioned proximate one of the one or more receiving recesses so as to direct said fluid flow to a seating surface of a respective one of the one or more reed valve modules.

42. The method of claim 41, further comprising, after inserting the one of the one or more reed valve modules into the respective receiving recess, attaching a retainer plate over the seat plate to retain the one of the one or more reed valve modules in the respective receiving recess of the one or more receiving recesses.

43. The method of claim 42, further comprising:

removing the retainer plate from the seat plate; and after removing the retainer plate from the seat plate, removing the one of the one or more reed valve modules from the respective receiving recesses of the one or more receiving recesses.

44. A mechanical device, comprising:

a frame comprising at least two fluid chambers; and one or more reed valve modules connected to the frame, wherein the one or more reed valve modules are adapted to control a flow of a fluid between the at least two fluid chambers, each of the one or more reed valve modules comprising:

a module body comprising a seating surface that surrounds an entire periphery of a flow inlet, one or more first sealing faces on an outer surface of a first side of the module body and one or more second sealing faces on an outer surface of a second side of the module body, and one or more fluid flow passages, each of the one or more fluid flow passages leading from the flow inlet at the seating surface to a flow outlet passing through one of the one or more first and second sealing faces, wherein one of the one or more first and second sealing faces completely surrounds and encloses a respective flow outlet passing therethrough, and wherein an inside surface of the module body defines a cavity;

a plurality of transverse ribs inside of the module body and reinforcing the cavity, wherein each respective rib of the plurality of transverse ribs extends across the cavity from the first side of the module body to the second side of the module body and has an exposed end surface that is positioned proximate and substantially aligned with one of the one or more first and second sealing faces;

a plurality of lateral ribs positioned inside of and reinforcing the module body cavity, each of the plurality of lateral ribs extending laterally between and laterally supporting an adjacent pair of the plurality of transverse ribs; and one or more reed petals that are positioned on the outer surface of the module body, wherein each of the one or more reed petals is positioned over a respective one of the one or more first and second sealing faces and over the exposed end surface of at least one rib of the plurality of transverse ribs, to extend across and cover an entirety of at least one flow outlet, and to close off fluid flow through the at least one flow outlet when the respective reed petal contacts and seals against the respective one of the one or more first or second sealing faces surrounding the at least one flow outlet while the respective reed petal is in a closed position, wherein the respective one of the one or more first or second sealing faces and the exposed end surface of the at least one rib support the respective reed petal when the respective reed petal is in said closed position, and wherein a spacing between each of the plurality of transverse ribs enables each of the one or more reed petals to withstand a differential pressure acting thereon when the respective reed petal is in said closed position.

45. The mechanical device of claim 44, wherein the exposed end surface of each of the plurality of transverse ribs is flush with one of the one or more first and second sealing faces.

46. The mechanical device of claim 44, further comprising at least one modular reed valve assembly having one or more receiving recesses, wherein each of the one or more receiving recesses are adapted to receive a respective one of the one or more reed valve modules.

47. The mechanical device of claim 46, further comprising one or more sets of the one or more reed valve modules, wherein each set of the one more reed valve modules has a different set of dimensions and each of the one or more receiving recesses is adapted to receive a respective one of the one or more sets of the one or more reed valve modules.

48. A reed valve module, comprising:
a module body having an inside surface that defines a cavity, the module body comprising:
  a seating surface;
  a plurality of adjacent sealing surfaces on an outer surface of the module body; and
  one or more fluid flow passages, each of the one or more fluid flow passages leading from a flow inlet at the seating surface to a flow outlet passing through one of the plurality of adjacent sealing faces, wherein one of the plurality of adjacent sealing faces completely surrounds and encloses a respective flow outlet passing therethrough;
a plurality of transverse ribs inside of the module body and reinforcing the cavity, wherein at least one rib of the plurality of transverse ribs extends across the cavity from the first side of the module body to the second side of the module body and has an exposed end surface that is positioned proximate and substantially aligned with one of the plurality of adjacent sealing faces; and
a plurality of contiguous reed petals that are adapted to be positioned on the outer surface of the module body, a portion of each of the plurality of contiguous reed petals being attached to a corresponding portion of an adjacent one of the plurality of contiguous reed petals, wherein each of the plurality of contiguous reed petals is adapted to be positioned over and cover at least a respective one of the plurality of adjacent sealing faces and over the exposed end surface of at least one rib of the plurality of transverse ribs, to extend across and cover an entirety of at least one flow outlet, and to close off fluid flow through the at least one flow outlet when the respective reed petal contacts and seals against the at least one of the plurality of adjacent sealing faces surrounding the at least one flow outlet while the respective reed petal is in a closed position, wherein the respective one of the plurality of adjacent sealing faces and the exposed end surface of the at least one rib are adapted to support the respective reed petal when the respective reed petal is in said closed position, and wherein a spacing between each of the plurality of transverse ribs is adapted to enable each of the plurality of contiguous reed petals to withstand a differential pressure acting thereon when the respective reed petal is in said closed position.

49. A reed valve module, comprising:
a module body having an inside surface that defines a cavity, the module body comprising:
  a seating surface;
  one or more sealing faces on an outer surface of the module body, said one or more sealing faces comprising:
    a first sealing face on a first side of the module body, the first sealing face having a first flow outlet passing therethrough;
    a second sealing face on a second side of the module body that is opposite the first side, the second sealing face having a second flow outlet passing therethrough;
    a third sealing face on a third side of the module body that is adjacent to the first side, the third sealing face having a third flow outlet passing therethrough;
    a fourth sealing face on a fourth side of the module body that is opposite the third side, the fourth sealing face having a fourth flow outlet passing therethrough;
    a fifth sealing face on a fifth side of the module body that is adjacent to the third side, the fifth sealing face having a fifth flow outlet passing therethrough; and
    a sixth sealing face on a sixth side of the module body that is opposite the fifth side, the sixth sealing face having a sixth flow outlet passing therethrough; and
  one or more fluid flow passages, each of the one or more fluid flow passages leading from a flow inlet at the seating surface to a flow outlet passing through one of the one or more sealing faces, wherein one of the one or more sealing faces completely surrounds and encloses a respective flow outlet passing therethrough;
a plurality of transverse ribs inside of the module body and reinforcing the cavity, wherein at least one rib of the plurality of transverse ribs extends across the cavity from the first side of the module body to the second side of the module body and has an exposed end surface that is positioned proximate and substantially aligned with one of the one or more sealing faces; and
one or more reed petals that are adapted to be positioned on the outer surface of the module body, wherein each of the one or more reed petals is adapted to be positioned over a respective one of the one or more sealing faces and over the exposed end surface of at least one rib of the plurality of transverse ribs, to extend across and cover an entirety of at least one flow outlet, and to close off fluid flow through the at least one flow outlet when the respective reed petal contacts and seals against the respective one of the one or more sealing faces surrounding the at least one flow outlet while the respective reed petal is in a closed position, wherein the respective one of the one or more sealing faces and the exposed end surface of the at least one rib are adapted to support the respective reed petal when the respective reed petal is in said closed position, and wherein a spacing between each of the plurality of transverse ribs is adapted to enable each of the one or more reed petals to withstand a differential pressure acting thereon when the respective reed petal is in said closed position.

50. A reed valve assembly, comprising:

a seat plate comprising one or more fluid conduits;

a separate structure having one or more receiving recesses, each of the one or more receiving recesses being positioned proximate at least one of the one or more fluid conduits, wherein the separate structure is sandwiched between the seat plate and a retainer plate and held together by one or more fasteners; and one or more reed valve modules sized to fit within each of the one or more receiving recesses and adapted to receive a fluid flow from a respective one of the one or more fluid conduits, wherein each of the one or more reed valve modules comprises:

a module body comprising a seating surface, one or more first sealing faces on an outer surface of a first side of the module body and one or more second sealing faces on an outer surface of a second side of the module body, and one or more fluid flow passages, each of the one or more fluid flow passages leading from a flow inlet at the seating surface to a flow outlet passing through one of the one or more first and second sealing faces, wherein one of the one or more first and second sealing faces completely surrounds and encloses a respective flow outlet passing therethrough, and wherein an inside surface of the module body defines a cavity;

a plurality of transverse ribs inside of the module body and reinforcing the cavity, wherein each respective rib of the plurality of transverse ribs extends across the cavity from the first side of the module body to the second side of the module body and has an exposed end surface that is positioned proximate and substantially aligned with one of the one or more first and second sealing faces; and one or more reed petals that are positioned on the outer surface of the module body, wherein each of the one or more reed petals is positioned over a respective one of the one or more first and second sealing faces and over the exposed end surface of at least one rib of the plurality of transverse ribs, to extend across and cover an entirety of at least one flow outlet, and to close off fluid flow through the at least one flow outlet when the respective reed petal contacts and seals against the respective one of the one or more first or second sealing faces surrounding the at least one flow outlet while the respective reed petal is in a closed position, wherein the respective one of the one or more first or second sealing faces and the exposed end surface of the at least one rib support the respective reed petal when the respective reed petal is in said closed position, and wherein a spacing between each of the plurality of transverse ribs enables each of the one or more reed petals to withstand a differential pressure acting thereon when the respective reed petal is in said closed position.

* * * * *